United States Patent
Sterbling et al.

(10) Patent No.: US 11,803,421 B2
(45) Date of Patent: Oct. 31, 2023

(54) MONITORING HEALTH STATUS OF A LARGE CLOUD COMPUTING SYSTEM

(71) Applicant: International Business Machines Corporation, Armonk, NY (US)

(72) Inventors: Sven Sterbling, Tuebingen (DE); Torsten Teich, Stuttgart (DE); Joerg Mueller, Horb (DE); Georg Bildhauer, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 17/171,380

(22) Filed: Feb. 9, 2021

(65) Prior Publication Data
US 2022/0253340 A1    Aug. 11, 2022

(51) Int. Cl.
*G06F 9/50*     (2006.01)
*G06N 5/02*     (2023.01)
(Continued)

(52) U.S. Cl.
CPC ........ *G06F 9/5027* (2013.01); *G06F 9/45558* (2013.01); *G06N 5/02* (2013.01); *G05B 2219/42033* (2013.01); *G06Q 10/06312* (2013.01)

(58) Field of Classification Search
CPC .................................................. G06F 9/5027
See application file for complete search history.

(56) References Cited

U.S. PATENT DOCUMENTS 6,738,811 B1    5/2004 Liang
8,923,186 B1    12/2014 Dacosta
(Continued)

FOREIGN PATENT DOCUMENTS

CN    110691329 A    1/2020
KR    20190067870 A    6/2019

OTHER PUBLICATIONS

"PCT Notification of Transmittal of the International Search Report and the Written Opinion of the International Searching Authority, or the Declaration", Applicant's file reference PF211190PCT, International application No. PCT/CN2022/075497, International filing date Feb. 8, 2022, dated May 5, 2022, 10 pages.
"Datadog", From Wikipedia, the free encyclopedia, page was last edited on Jan. 20, 2021, 2 pps., <https://en.wikipedia.org/wiki/Datadog>.

(Continued)

*Primary Examiner* — Charlie Sun
(74) *Attorney, Agent, or Firm* — Stephen R. Yoder

(57) ABSTRACT

Aspects of the present invention disclose a method, computer program product, and system for monitoring a health status of a computing system. The method includes one or more processors deploying a respective monitoring prediction agent in each of a plurality of worker nodes of a computing system. The method further includes determining, for each of the plurality of worker nodes by the respective monitoring prediction agent, a single binary health status value by comparing a time-dependent function of performance metric data values of the respective worker node to upper and lower threshold values. The method further includes receiving the binary health status values together with respective identity information from each of the plurality of worker nodes. The method further includes generating a dataset indicative of a health status of the computing system by feeding the received respective identity information to hash functions of a Counting Bloom Filter.

20 Claims, 9 Drawing Sheets

(51) Int. Cl.
    *G06F 9/455*     (2018.01)
    *G06Q 10/0631*     (2023.01)

(56) References Cited

U.S. PATENT DOCUMENTS

| | | | |
|---|---|---|---|
| 8,930,770 B2 | 1/2015 | Stanko | |
| 9,172,738 B1 | 10/2015 | Dacosta | |
| 9,276,826 B1 * | 3/2016 | Dickson | H04L 41/145 |
| 9,338,065 B2 | 5/2016 | Vasseur | |
| 9,552,334 B1 | 1/2017 | Meisels | |
| 9,730,100 B2 | 8/2017 | Dacosta | |
| 9,753,796 B2 | 9/2017 | Mahaffey | |
| 9,948,741 B2 | 4/2018 | Yang | |
| 10,122,747 B2 | 11/2018 | Mahaffey | |
| 10,142,362 B2 | 11/2018 | Weith | |
| 10,664,837 B2 | 5/2020 | Greifeneder | |
| 10,866,971 B2 | 12/2020 | Bensberg | |
| 2004/0010716 A1 | 1/2004 | Childress | |
| 2010/0046842 A1 | 2/2010 | Conwell | |
| 2012/0254669 A1 | 10/2012 | Xia | |
| 2012/0284571 A1 | 11/2012 | Stanko | |
| 2014/0052750 A1 | 2/2014 | Ciabrini | |
| 2014/0132767 A1 | 5/2014 | Sonnabend | |
| 2015/0195149 A1 | 7/2015 | Vasseur | |
| 2015/0220625 A1 | 8/2015 | Cartmell | |
| 2015/0351655 A1 | 12/2015 | Coleman | |
| 2016/0191646 A1 | 6/2016 | Yang | |
| 2016/0364812 A1 | 12/2016 | Cao | |
| 2017/0039324 A1 | 2/2017 | Francois | |
| 2017/0060769 A1 | 3/2017 | Wires | |
| 2017/0359220 A1 | 12/2017 | Weith | |
| 2018/0089289 A1 | 3/2018 | Zhang | |
| 2018/0115463 A1 | 4/2018 | Sinha | |

OTHER PUBLICATIONS

"IBM Cloud Monitoring with Sysdig", Cloud Monitoring with Sysdig—Overview | IBM, 3 pps., printed from the internet on Jan. 28, 2021, <https://www.ibm.com/cloud/sysdig>.

"Monitoring as a service", From Wikipedia, the free encyclopedia, page was last edited on Apr. 7, 2020, 1 pp., <https://en.wikipedia.org/wiki/Monitoring_as_a_service>.

"System and Method to Predict and Dynamically Adjust the Allocation of Resources for Cloud", IP.com No. IPCOM000225612D, IP.com Electronic Publication Date: Feb. 21, 2013, 9 pps., <https://priorart.ip.com/IPCOM/000225612>.

Birje et al., "Cloud Monitoring System: Basics, Phases and Challenges", 15 pps., International Journal of Recent Technology and Engineering (IJRTE) ISSN: 2277-3878, vol. 8 Issue-3, Sep. 2019, <https://www.ijrte.org/wp-content/uploads/papers/v8i3/C6857098319.pdf>.

Melo, "Monitoring Modern Container Infrastructure", Monitoring Modern Container Infrastructure | IaaS Blog—Oracle Cloud Infrastructure News, Sep. 13, 2019, 7 pps., <https://blogs.oracle.com/cloud-infrastructure/monitoring-modern-container-infrastructure>.

Narcisi, "Paessier Builds Monitoring-As-A-Service License with MSPs in Mind", CRN Magazine, 2 pps., Nov. 4, 2015.

Passerini et al., "Information Technology for Small Business: Managing the Digital Enterprise", Springer, New York, 2012, p. 35, ISBN 978-1-4614-3040-7.

Tarkoma et al., "Theory and Practice of Bloom Filters for Distributed Systems", Article in IEEE Communications Surveys & Tutorials—Mar. 2012 DOI: 10.1109/SURV.2011.031611.00024—Source: IEEE Xplore, 26 pps, <https://www.researchgate.net/publication/224230450_Theory_and_Practice_of_Bloom_Filters_for_Distributed_Systems>.

Ugbolue, "Polyolefin Fibres", Woodhead Publishing in Textiles, Industrial and Medical Applications, 2009, CRC, pp. 44-45, ISBN 978-1-84569-207-0.

Weise, "5 Things to Know About Monitoring as a Service", The Data Center Journal, Oct. 3, 2016, 3 pps., <https://web.archive.org/web/20180708085825/datacenterjournal.com/5-things-know-monitoring-service/>.

Xiong et al., "kBF: a Bloom Filter for Key-Value Storage with an Application on Approximate State Machines", 9 pps, Copyright 2014 IEEE, <https://ieeexplore.ieee.org/document/6848046>.

* cited by examiner

MONITORING HEALTH STATUS OF A LARGE CLOUD COMPUTING SYSTEM

BACKGROUND OF THE INVENTION

The present invention relates generally to the field of computer system analytics, and more particularly to monitoring a health status of a computing system.

Monitoring IT (information technology) infrastructure components has always been an independent IT discipline. With its help, components of an IT landscape of an enterprise, and also of cloud computing environments, can be managed efficiently, remotely and continuously. Additionally, potential bottlenecks may be detected early on in order to prevent unplanned downtimes of individual components of the IT infrastructure.

Monitoring as a service (MaaS) is one of many cloud computing delivery models under anything as a service (XaaS). Monitoring as a service is a framework that facilitates the deployment of monitoring functionalities for various services and applications within the cloud computing environment. The most common application for MaaS is online state monitoring of IT components, which continuously tracks certain states of applications, networks, systems, instances or any element that may be deployable within the cloud computing environment. A couple of products are currently on the market collecting a large number of status data from IT components over time and under different aspects. Typically, these status data are collected in a central place and analyzed under a plurality of different aspects. The overhead involved in such complex status tracking systems as well as the required data analytics coming along with the complexity of the data can become significant and an additional burden (a) for the observed infrastructure components and (b) for the central analytical services required to extract some meaning from the large amount of collected data.

And this for at least one good reason: outages in cloud computing systems usually have direct customer impact: typically, a service is unavailable for a short period of time (seconds or minutes) based on incidents. Incidents can be anything, such as a network outage and unavailability of an adjacent service (e.g., a database, a messaging system, etc.).

SUMMARY

Aspects of the present invention disclose a method, computer program product, and system for monitoring a health status of a computing system. The method includes one or more processors deploying a respective monitoring prediction agent in each of a plurality of worker nodes of a computing system. The method further includes one or more processors determining, for each of the plurality of worker nodes by the respective monitoring prediction agent, a single binary health status value. The method of determining respective single binary health status values further includes one or more processors comparing a time-dependent function of performance metric data values of the respective worker node to a predefined configurable upper threshold value and a configurable lower threshold value. The method further includes one or more processors receiving the binary health status values together with respective identity information from each of the plurality of worker nodes. The method further includes one or more processors generating a dataset indicative of a health status of the computing system by feeding the received identity information of each of the plurality of worker nodes to hash functions of a Counting Bloom Filter.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited. Preferred embodiments of the invention will be described, by way of example only, and with reference to the following drawings.

DETAILED DESCRIPTION

Figure 1:
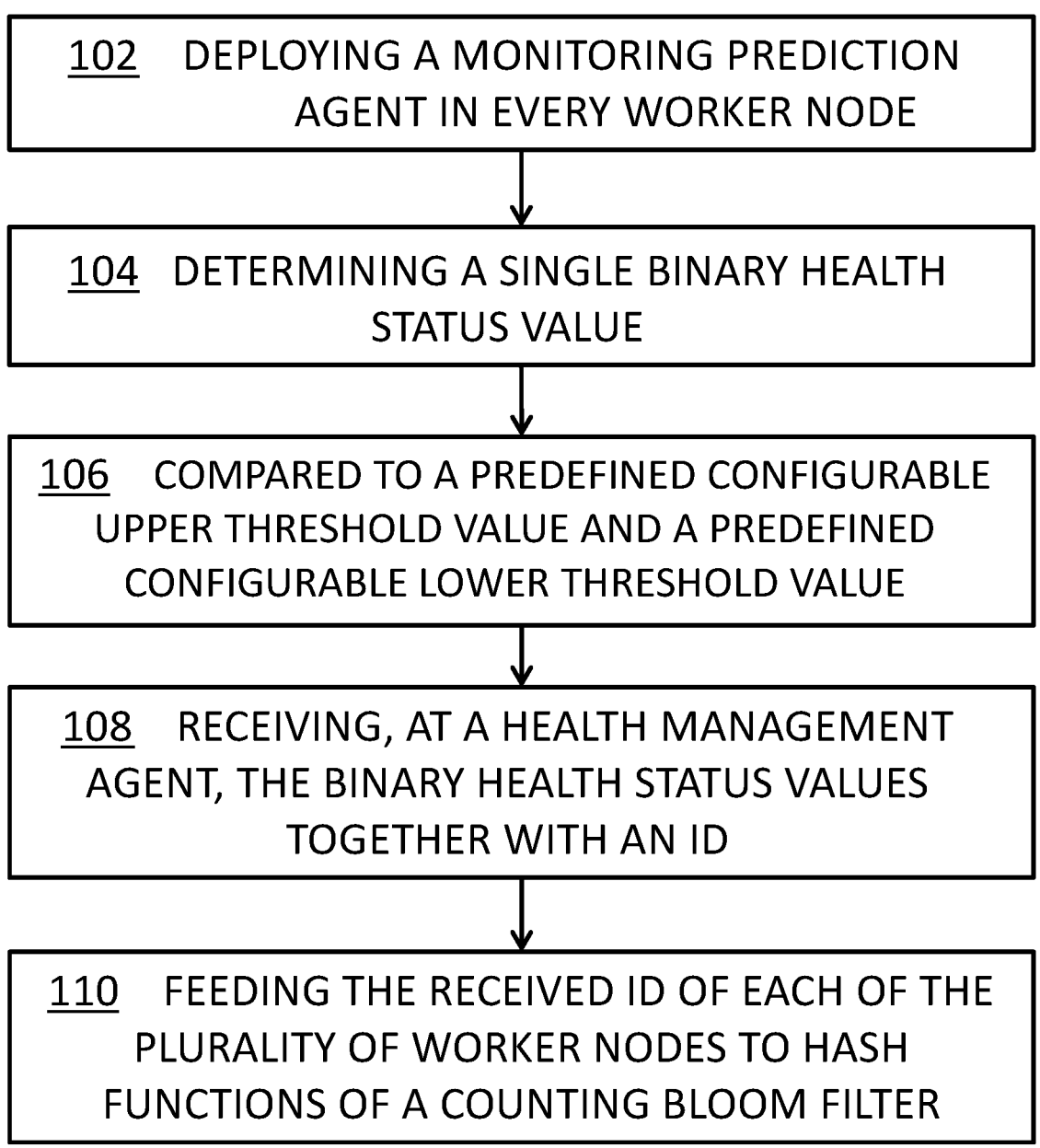
FIG. 1 depicts a block diagram of an embodiment of the inventive computer-implemented method for monitoring a health status of a computing system comprising a plurality of worker nodes, in accordance with embodiments of the present invention.

In the context of this description, the following conventions, terms and/or expressions may be used.

The term 'health status' or health status value may denote a numerical indicator value expressing the well-functioning of a complex system, like a worker node or a computing system or a plurality of worker nodes of a plurality of computing systems. In various embodiments, term 'health status' or health status value can indicate a status of "trouble is ahead" or "all systems running smoothly."

The term 'computing system' may denote a hardware computing system, a plurality thereof, a cluster, a cloud computing center and/or also one or more virtual machines or computing containers (e.g., Docker containers). The computing system may also be a network or a storage system or comparable systems. Also, other peripheral units may be described as computing system in the context of the proposed concept, in accordance with various embodiments of the present invention.

The term 'worker node' may denote a virtual or physical computing system or a part thereof. The worker node may be adapted to execute program code. Thus, also virtual machines or stateless computing containers may be denoted as worker nodes. The worker nodes may be deployed in a large cloud computing center, such as in a range of 10,000 or 100,000 or even more.

The term 'monitoring prediction agent' may denote a function within a worker node with an ability of determining a binary health status value of the worker node. In example embodiments, a 'monitoring prediction agent' can express the memory usage of the worker node.

The term 'single binary health status value' may denote a logical "0" or a logical "1". In example embodiments, the logical "0" may stand for "no problems detected" and the logical "1" may express that "a potential problem may be present" in the respective worker node.

The term 'time-dependent function' may denote here, for example, a PID (proportional-integral-derivative) filter using a given set point of, e.g., consumable memory and an actually determined memory usage, whereby also short-term history memory consumption values can be reflected. Thereby, a memory consumption may also by one example of other resources of the worker node.

The term 'performance metric data value' may denote a real numeric data value and be able to express particular resource consumption by a computing system with more computational processes. One example may be the percentage of consumed memory if compared to the total memory available. Other performance metric data values may relate to a network usage or processor usage or computer power usage.

The term 'upper threshold value' may denote a numerical value (e.g., a percentage value), which may be uploaded to the monitoring prediction agent at initialization time against which the value of performance metric data can be compared. Hence, two percentage values may be compared to each other. If the performance metric data value may exceed the upper threshold value, a logical "1" may be generated as binary health status value of the respective worker node. The term 'lower threshold value' may denote a corresponding threshold value if compared to the upper threshold value.

The term 'health management agent' may denote a central processor or system controlling various aspects of the present invention in being the place of the CBF(s) (Counting Bloom Filter) for a determination of the health status of the plurality of worker nodes. Typically, but not necessarily, the health monitoring agent may be deployed remotely to the worker node and may also be a portion of a MaaS solution.

The term 'identity information' may denote, for example, an address label and a corresponding network (e.g., a worker node). However, also portions of the network address may be used as identity information. For example, the virtual machine portion of the complete address, a related hardware system address, a cluster address or a region address.

The term 'hash function' may denote any function that may be used to map data (e.g., address data) of arbitrary size to fixed-size values. The values (e.g., index pointers to an index field of a data array) returned by a hash function are called hash values, hash codes, digests, or simply hashes.

The term 'Counting Bloom Filter' (CBF) may denote a generalized data structure of a Bloom Filter, which may be used to test whether a count number of a given element, is smaller than a given threshold when a sequence of elements is given. As a generalized form of a Bloom filter, false positive matches are possible, but false negatives are not— in other words, a query returns either "possibly bigger or equal than the threshold" or "definitely smaller than the threshold." Here, the hash functions map incoming data (e.g., address data) to counters which are part of the Bloom Filter dataset or data array.

The term 'dataset' may denote an array of (e.g., integer values) of fields in an array in which logical "1" values are increased or decreased depending on the binary health status value received.

The term 'timeseries' may denote that data values of comparable data structures are stored persistently in order to generate a time-dependent set of data for further analysis.

The term 'cloud computing' may in this context be interpreted as a model for enabling convenient, on-demand network access to a shared pool of configurable computing resources (e.g., networks, servers, storage, applications, and services) that can be rapidly provisioned and released with minimal management effort or service provider interaction. The remote multi-tenant computing environment may be implemented as cloud computing data center. The cloud model promotes availability and is composed of at least five essential characteristics, three service models and four deployment models.

Essential characteristics of cloud computing comprise
  (i) On-demand self-service. A consumer can unilaterally provision computing capabilities, such as server time and network storage, when needed automatically without requiring human interaction with each service provider.
  (ii) Broad network access. Capabilities are available over the network and accessed through standard mechanisms that promote use by heterogeneous thin or thick client platforms (e.g., mobile phones, laptops, and PDAs).
  (iii) Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.
  (iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.
  (v) Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud computing use comprise:

(i) Cloud Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

(ii) Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

(iii) Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise (i) Private cloud. The cloud infrastructure is operated solely by an organization. It may be managed by the organization or a third party and may exist on premise or off premise.

(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.

(iii) Public cloud. The cloud infrastructure is made available to the general public or a large industry group and is owned by an organization selling cloud services.

(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness (with exceptions), low coupling, modularity, and semantic interoperability. This in particular applicable for worker nodes on or in computing systems deployed in a cloud computing center.

The proposed computer-implemented method for monitoring a health status of a computing system comprising a plurality of worker nodes may offer multiple advantages, contributions and technical effects.

Embodiments of the present invention recognize that although recovery or high-availability systems are typically in place in enterprise grade IT infrastructures, users may experience an outage of a single micro-service or a number of micro-services. From the point of view of a cloud provider, this is necessary in order to prevent such outages as well as possible and with the least possible effort. However, for this objective the currently available monitoring services and systems may be too complex and may represent a real burden to the existing IT infrastructure and its operators. In particular, in environments in which 10,000 or even 100,000 services have to be monitored, embodiments of the present invention recognize that a more sophisticated, easy to handle and highly automated MaaS technique would be required.

In contrast to traditional monitoring systems and systems management systems, embodiments of the present invention can operate to reduce the health status of a worker node to a single binary health status value (basically "0" or "1") thereby requiring as little information as possible and producing no overhead. As discussed above, traditional monitoring systems collect a large variety of life power meter values of a computing system or potentially also from a running service. The herewith involved overhead in respect to the memory consumption required on or in the worker node, as well as the analysis system, in respect to the bandwidth required to transmit all these parameter values from the worker node to a central analysis system, as well as the required computing capacity on the central analysis system, can be reduced to a bare minimum of one bit. Thus, the collection of one hundred or even one thousand or more data points per second by traditional monitoring systems can be avoided by limiting the worker node health status to one important data point. The data point or this performance metric data value may be the memory consumption of a specific worker node (e.g., a computer system), a virtual machine, a hypervisor, or a program execution container and the like.

Thus, embodiments of the present invention can operate to drastically reduce the amount of data, whereby each worker node may be made slim and lightweight. Also, the calculation and reaction time may be reduced significantly. Accordingly, the proposed concept may be especially applicable in large and very large cloud computing systems with tens of thousands of services being executed on a hardware computing platform.

Furthermore, the monitoring prediction agent associated with one worker node may not only compare the selected performance metric data value (e.g., the memory consumption) against a fixed upper limit, but may determine the memory consumption over a (short) historic time and reflect developments of the memory consumption of the worker node in its single binary health status value.

The then following comparison to an upper threshold value and a lower threshold value, both being configurable, does not only check against an upper dangerous memory consumption value but also against a suspicious lower threshold value that may indicate that something could be wrong with the observed service because, for example, the indicated memory may be still small for the entitled process software together with its buffers and caches. Hence, even in this case, a too low memory consumption may also be an indication of a small function of the respective service in the worker node.

The use of the Counting Bloom Filter (CBF) may also represent an interesting concept in the context of the proposed method for monitoring the health status of the computing system. A central concept of the CBF is a decoupling of data in a filter data array and the respective sources (i.e., the worker nodes). Thus, a monitoring service operator may be able to tell which specific one of the observed services may have problems, but the service operator is able to say that a group of worker nodes may exceed some threshold or may represent a computing power consumption trend that may be abnormal. Hence, from a security and data privacy perspective, the proposed concept may also get high marks because not any detailed data are captured.

Furthermore, various embodiments of the present invention can expand the concept of the CBFs by not only adding events to a certain identifier of the worker nodes, but also reducing counters in the filter data array if no problems are reported from the worker nodes. Additionally, by building a sum across all filter array cell contents (e.g., by building the sum across all CBF cell and dividing by the number of cache functions) one may also get an indication about computing nodes that potentially fail (e.g., due to an overload).

In addition, the indicator of the worker node may also comprise, in addition to the ID of the worker node itself, ID information of a cluster or a region. Thus, the health status of the cluster and the region may also be monitored independently of the health status of the worker node itself.

Therefore, although embodiments of the present invention can operate to transmit only one bit of health status information over the network, embodiments of the present invention can provide the advantage of predicting situations for computer systems, clusters and entire regions in cloud computing systems that were not planned and could present a dangerous setting. Accordingly, embodiments of the present invention can transfer a workload from one computing system to another, from one region to another or from one cluster to another. The task may be performed by a related systems management tool. Accordingly, embodiments of the present invention may be well integrated in a lightweight but powerful MaaS solution for monitoring even very large could computing installations with 10,000s or even 100,000s of worker nodes.

In the following, additional embodiments, applicable to the method as well as to the related system, will be described in further detail.

According to an example embodiment the performance metric data value may relate to, or be, the memory usage of the respective worker node, which can represent a characteristic performance metric value indicative of how the worker node performs its task. Given upper and lower boundaries, the health status of the worker node may be characterized by such a single binary value. Especially, because the monitoring prediction agent may also have access to the most recent memory usage (e.g., in a timeseries form) the agent may be enabled to also predict the development of the expected memory usage for the near future. The function may be performed by a PID (proportional, integrated, differential) filter, which result may also be compared with predefined upper and lower threshold values. Accordingly, a too low memory usage may, in the same way as a too high memory usage, indicate a potential problem within the worker node. Therefore, according to an advanced embodiment, a determining of the single binary health status value by the time-dependent function may comprise using a PID filter as part of the monitoring prediction agent for determining a predicted memory usage.

Further, instead of the memory usage various embodiments of the present invention can utilize other parameter values, such as a network bandwidth used, a required total storage capacity, an I/O (input/output) rate, a CPU usage, an internal bus usage and/or other respective percentage values.

According to another embodiment of the method, the dataset may be stored as an array (e.g., as integer values) of predefined length (e.g., having a length for a predefined time period), where a portion of the identity information may be used as input to the hash functions. Thereby, output values of the hash functions may be index values for addressing data fields in the array, and a respective value of each of the addressed data fields of the dataset may be increased (e.g., by one) if the received respective single binary health status value is logical "1". Other increment values may also be possible.

As a consequence, and according to another embodiment, embodiments of the present invention can operate to reduce a respective value of each of the addressed data fields of the dataset (e.g., by one) if the received respective single binary health status value is logical "0". Thus, the Counting Bloom Filter may live up to its full potential.

Additionally, it may be mentioned, that the portion of the identity information may relate to a respective hardware node, or a rack of computing nodes, or a cluster of nodes or racks, or a region. Additionally, also the complete identity information (i.e., the complete network address) may be used as input for the respective hash functions.

According to one advantageous embodiment, the sum of the values of the data fields in the array is indicative of the health status of the computing system. For this, all values of all area fields may be summed up. Additional aspects can also provide the functionality to reset the data area fields after a predefined time interval. Hence, normalization to "zero" may be performed on a regular basis to adapt to changed general conditions of the overall system comprising the plurality of worker nodes.

Further, each worker node, after the respective initialization, may send a "1" shortly after an initialization time and a logical "0" after a computing process in the work amount is up and running. The communications from the worker nodes can operate to reset the respective fields in the data array, which may be used as an indicator for a successful initialization of the respective computing process or processes in the worker node.

According to example embodiments, the method may also comprise storing health status values (e.g., statuses of the CBF) in a persistent storage, thereby generating computing system load history data. The storage of the health status (e.g., copies of the values of the CBF) may be stored regularly or if one or more predefined threshold values for the health status values may be overrun or underrun, which can allow a fine-tuning of the health status management system.

According to another example embodiment, the method may also comprise determining (e.g., predicting, using a trend calculating engine) an excepted computing system load value based on the computing system load history data for a specific point in time in the future. Such a collective and protective value of a system load (e.g., may represent a status of a larger collection of worker nodes) may help operators or subsequent workload control systems determining pre-cautious actions to predict a system overload.

Therefore, and according to another example embodiment, the method may also comprise, upon the excepted computing system load value exceeding a predefined computing system load value, initiating a recommended corrective infrastructure or workload management action. Such a recommended corrective infrastructure or workload management action may comprise a redeployment of a portion of the worker node of the computing system on another, not so busy, hardware node. Furthermore, other corrective actions, which may especially be dependent on a given use case, may be instructed.

According to another embodiment of the method, a worker node may be selected out of the group consisting of a physical computing node, a plurality of physical nodes, a virtual machine, a plurality of virtual machines, a computing container (e.g., a Docker container) a plurality of computing containers, a computing process, and a plurality of computing processes. In addition, other objects to be monitored may also be supported by the proposed concept.

According to an additional embodiment, the method may also comprise receiving the configurable upper threshold value and the configurable lower threshold value during an initiation of the monitoring prediction agent. In some embodiments, only individual ones of the worker nodes or groups thereof may receive the upper and lower threshold values. Thereby, the values are not required to be identical for all worker nodes.

In the following, a detailed description of the Figures will be given. All instructions in the Figures are schematic. Firstly, a block diagram of an embodiment of the inventive computer-implemented method for monitoring a health status of a computing system comprising a plurality of worker nodes is given. Afterwards, further embodiments, as well as embodiments of the computing infrastructure monitoring system for monitoring a health status of a computing system comprising a plurality of worker nodes, will be described.

FIG. 1 depicts a block diagram of a preferred embodiment of the computer-implemented method 100 for monitoring a health status of a computing system, typically set up as an element of a cloud computing center, in accordance with embodiments of the present invention. In various embodiments, the computing system comprises a plurality of worker nodes, which may be physical or logical units, virtual machines, computing containers or hardware systems or the like. For the purpose of explanation, the method 100 described in FIG. 1 may be implemented in one or more of the diagrams and systems depicted in the system illustrated in FIG. 2 (e.g., utilizing one or more components of architecture 200), FIG. 4 (e.g., utilizing embodiment 400, of aspects of the functioning of the monitoring prediction agent), FIG. 7 (e.g., utilizing one or more components of the block diagram of an embodiment of the inventive computing infrastructure monitoring system 700), and FIG. 8 (e.g., utilizing computing system 800). In an example embodiment, one or more components of architecture 200, such as health management agent 214, can perform the processing steps of method 100. Alternatively, execution of method 100 is not limited to this implementation.

In step 102, method 100 comprises deploying a respective monitoring prediction agent in each of the plurality of worker nodes. In step 104, method 100 includes determining (e.g., via look-up or calculating) for each of the plurality of worker nodes by a respective monitoring prediction agent, a single binary health status value (e.g., "0" for "OK" and "1" for "something may be wrong") by a time-dependent function of at least one kind performance metric data value (e.g., a percentage of a memory usage per worker node) of the respective worker node. In step 106, method 100 compares the corresponding result to a predefined configurable upper threshold value and a configurable lower threshold value.

Next, in step 108, method 100 includes receiving at a health management agent, which may be remote to the worker nodes, the binary health status values together with respective identity information (e.g., IDs of worker nodes, clusters, regions, etc.) from each of the plurality of worker nodes (typically, in a regular basis). Then in step 110, method 100 includes feeding, at the health management agent, the received identity information of each of the plurality of worker nodes to hash functions of a Counting Bloom Filter, thereby generating a dataset indicative of the health status of the computing system. The dataset may be organized as an array of integer values.

Figure 2:
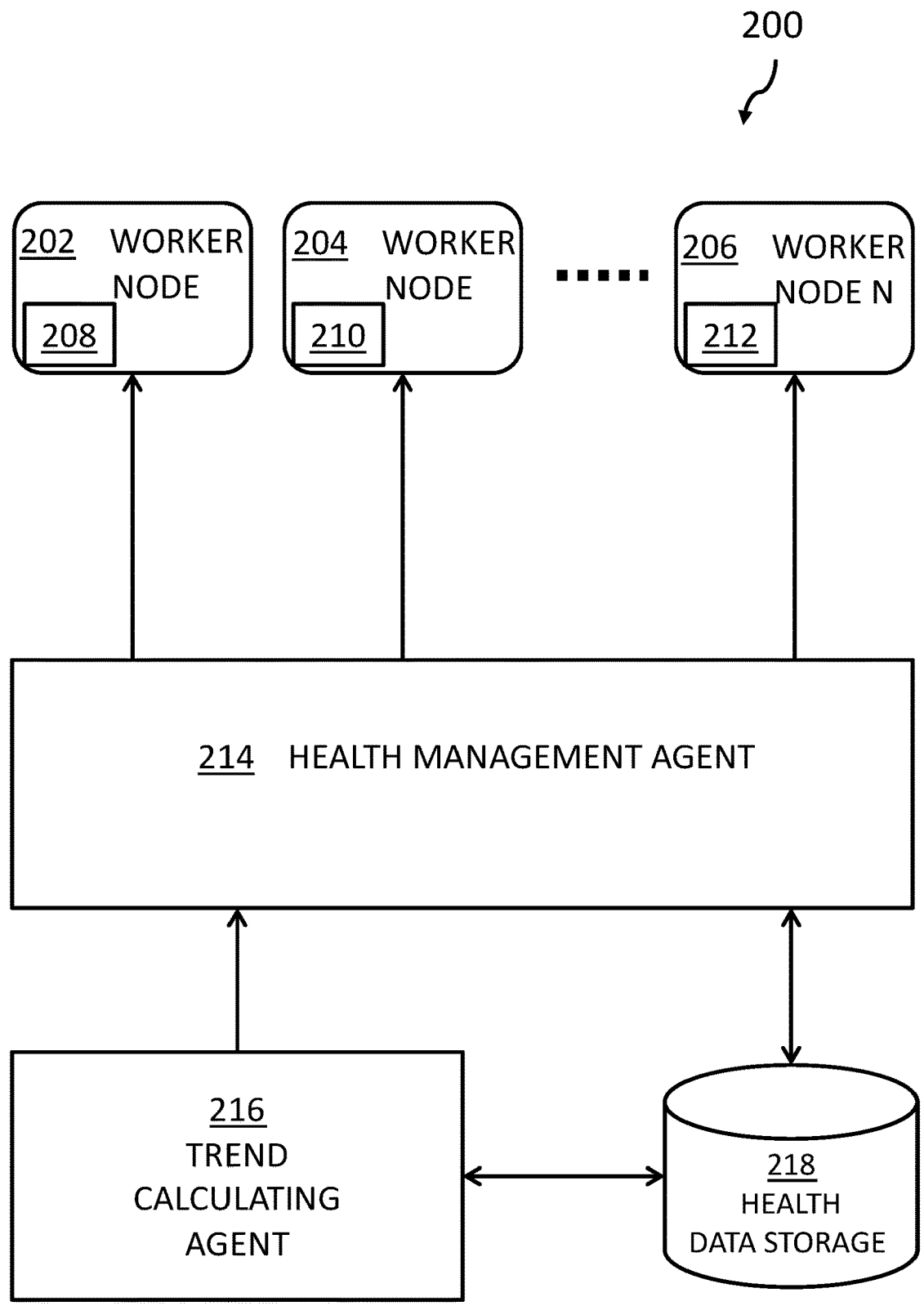
FIG. 2 depicts a block diagram of an embodiment of an architecture with components supporting the proposed concept, in accordance with embodiments of the present invention.

FIG. 2 depicts a block diagram of an embodiment of an architecture 200 of components supporting the proposed concept, in accordance with embodiments of the present invention. Each of the plurality of worker nodes (i.e., worker node 202, worker node 204, through worker node n 206) comprises the respective related monitoring prediction agent (i.e., monitoring prediction agent 208, monitoring prediction agent 210, and monitoring prediction agent 212). The arrows between the individual components may illustrate common occasion paths between the components. Firstly, the management agent 214, which may be executed remotely to the worker nodes 202, 204, through 206 in a central systems management system or MaaS solution initializes the worker nodes and sends an "initialize monitoring" action to the respective worker node. Each initializing worker node receives in "default load" specification which can be different from worker node to worker node. In particular, the health management agent can send the upper and lower threshold values to the respective worker nodes.

Furthermore, the CBF (Counting Bloom Filter) is initialized in the health management agent 214. Then, the worker nodes determine how the binary health status value, in particular a logical "0" (meaning "OK"), or a logical "1" (meaning "there may be a problem") using the corresponding monitoring prediction agent. The determination may be done regularly and/or cyclic or event-based. As described above (and also in the context of FIG. 1), the received binary health status values of the worker nodes 202, 204, through 206 update the CBF. Additionally, regular snapshots of the data array of the CBF can be stored at the health status storage 218 to generate a history of health values of the computing system.

The trend calculating agent 216 reads the CBF values and the snapshots for a determination of a predicted trend for the binary health status values of the plurality of worker nodes and derives from the trend recommended corrective actions for the computing system (i.e., the worker nodes). The health management agent 214 may then inform a systems management system for implementing the corrective action. For example, health management agent 214 can move parts of the workload (i.e., a portion of the worker nodes) to another hardware environment, or move the complete plurality of worker nodes to a more powerful hardware supporting system (e.g., in another region). Other options are making more memory available in the computing system or adding the additional resources to the computing system (e.g., by software enablement of the additional resources). Instead of implementing the corrective actions using a systems management system, the health management agent 214 may also implement the corrective actions directly by instructing the worker nodes directly.

Figure 3:
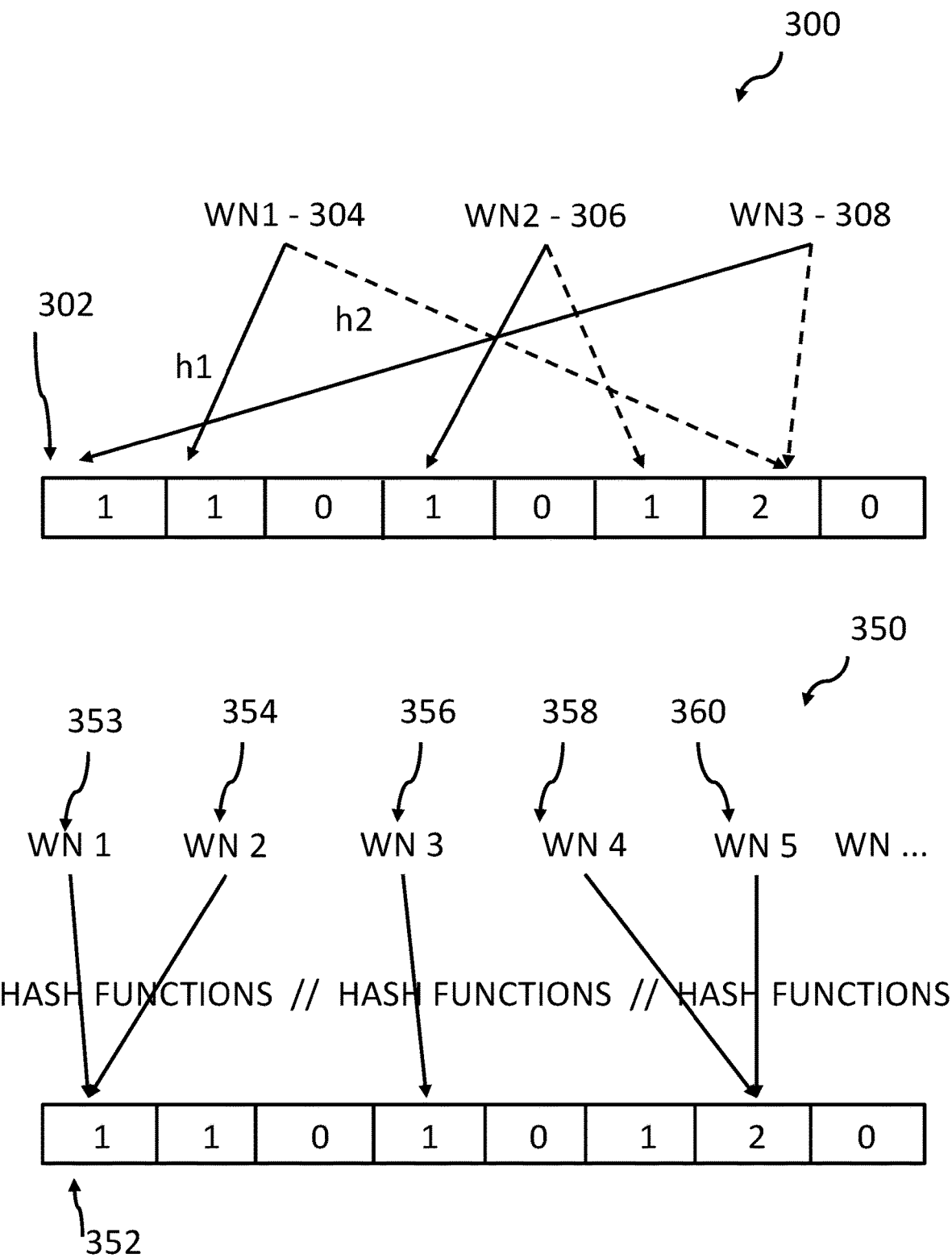
FIG. 3 depicts a block diagram of embodiments of a Counting Bloom Filter, in accordance with embodiments of the present invention.

FIG. 3 depicts a block diagram of embodiments of a Counting Bloom Filter 300. In the depicted example, h1 and h2 shall represent two different hash functions. In various embodiments, from the worker nodes WN1, 304, WN2 306 and WN3 308, logical "1's" are received. Either the complete address (i.e., an identifier or identifier information) is used as input to the hash functions h1 and h2. In another embodiment, a fine-tuned set of hash functions may be deployed. The index values that the fine-tuned hash functions generate can be limited to the length of the data array 302.

As can be seen, the second data field from the left is addressed for the identifier of WN1 304, which leads to a logical "1" in the data field of the data array 302. The same applies to the fourth and six data field of the data array 302 for the identifier information of worker node WN2 306. In the seventh field of the data array 302 (second data field from the right) the data field stores a "2". This is because the index value generated by the hash function h2 of the identifier information of worker node WN1 304 as well as the index value generated by the hash function h2 of the identifier information of the worker node WN3 308 point to the same data field or index of the data array 302.

The data fields in the data array 302 may also be denoted as categories for which the hash functions generate index values. In general, the values of the data fields of the data array 302 are increased if a logical "1" is received together with the respective identifier information (e.g., a portion (or all) of the address of the respective worker node). Furthermore, the counter on data field of the data array 302 is decreased if a logical "0" is received. In example implementations, the number of data fields in the data array 302 is much larger than the here shown eight fields. Additionally, the number of hash functions applied to each received identifier information may also be much larger.

If the data array 302 is initialized (or cyclically reset) with "all zeros", then embodiments of the present invention can generate negative values f more logical "0's" than logical "1's" are received. If one wishes to only have positive counter values in the data fields of the data array 302, then the initialization value for the individual counters should have a positive starting value (e.g., 512 or 1000 or similar).

In another embodiment 350, the nodes which report the status into the CBF are assigned to selected buckets in an orderly and controlled manner in the data array 352, which can allow nodes to be grouped dependent on categories such as expected actual load, cluster membership, security constraints, etc. The allotment can be adjusted at any time if assumptions or constraints change, which can be performed by operator. Such an embodiment may allow using one single CBF for different characteristics of the worker nodes. Alternatively, also separate CBFs may be used for such different characteristics, which can allow an even more fine-grained analysis of the computational load of the worker nodes. Here, the worker nodes WN1 353, WN2 354 may relate to the same bucket/characteristic of the worker node. The logical "1" for the respective data field in the data array 352 is only shown symbolically. WN3 356 creates its own category, while WN4 358 and WN5 360 create another category for other characteristics of the respective worker nodes.

If one sums up all values in the dataset (e.g., six for data array 302 and six for dataset/data array 352), then an indication is given for the health status of the computing system(s) hosting the worker nodes. In particular, in case of dataset 352 of the CBF only selected sets of data fields may be summed up in order to only analyze specific characteristics represented by the filed in the arrays/dataset.

Figure 4:
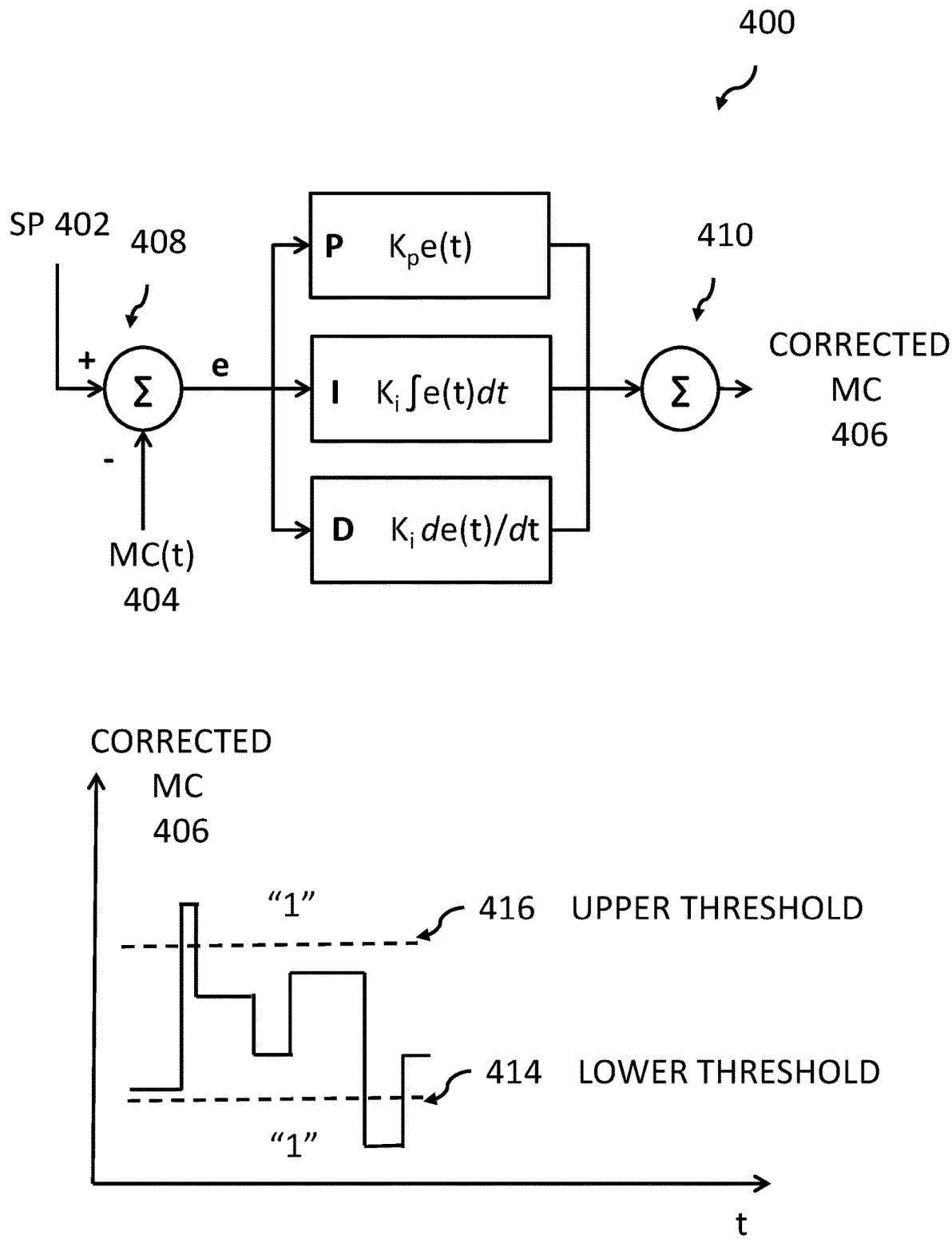
FIG. 4 depicts an embodiment of aspects of the functioning of the monitoring prediction agent, in accordance with embodiments of the present invention.

FIG. 4 symbolically depicts an embodiment 400 of aspects of the functioning of the monitoring prediction agent. As input to the adder 408, a setpoint (SP) value 402 as well as the measured time-dependent memory consumption MC(t) 404 is used. The proportional component P the integral component I and the differential component D of the PID filter determine specific values which are added by adder 410 to output a corrected and predicted memory consumption value 406.

The corrected memory consumption value 406 is shown in a time-dependent manner in the diagram 412. The values between the upper threshold value line 416 and the lower threshold value line 414 generates a logical "0" for the binary health status value of the respective worker node, where a too high corrected memory consumption value 406 (above the upper threshold value line 416) or a too low corrected memory consumption value 406 (below the lower threshold value line 414) generate a logical "1" as binary health status value of the respective worker node.

Figure 5:
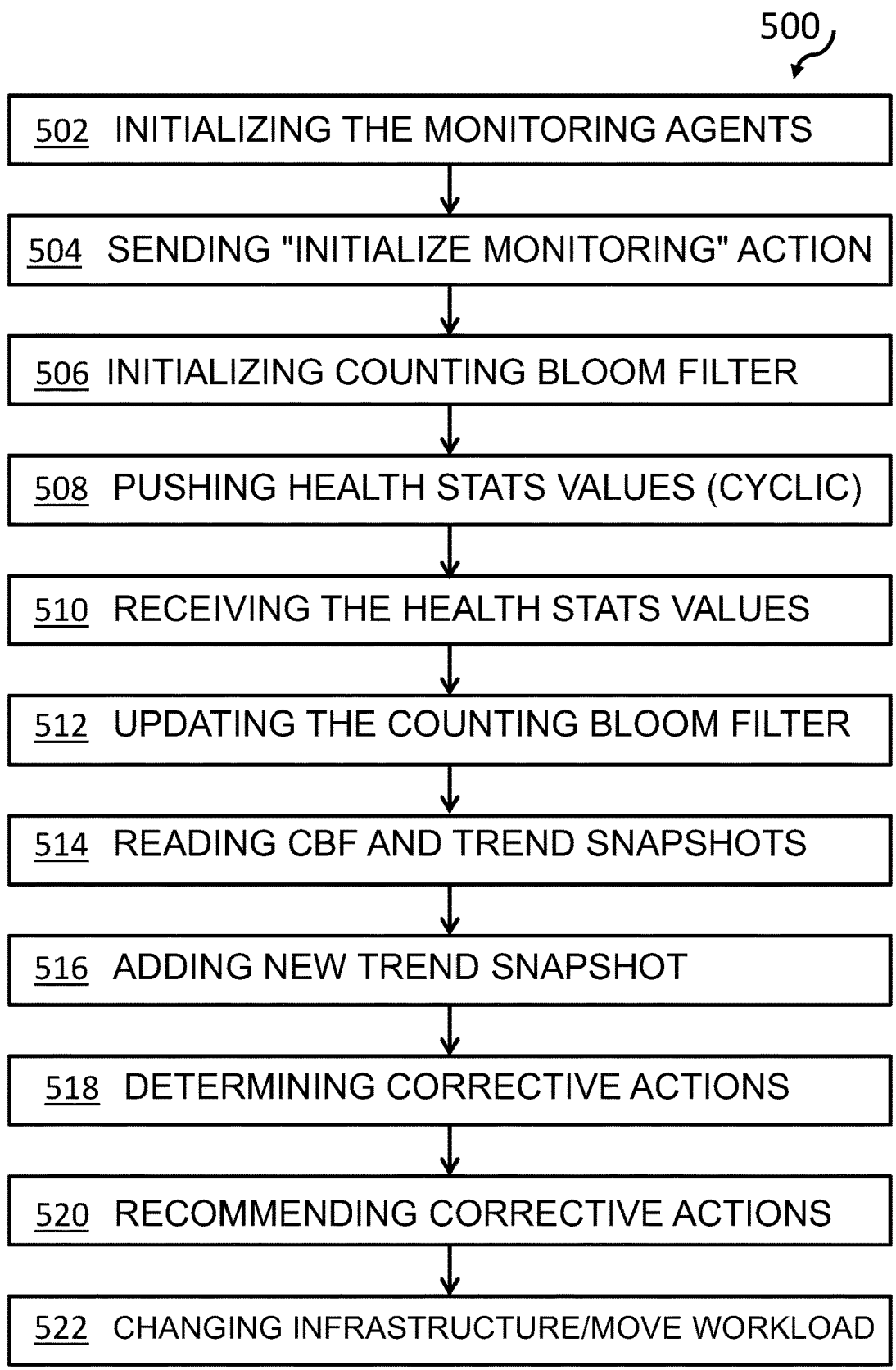
FIG. 5 depicts a flowchart of a more implementation near version of the embodiment of the overall method, in accordance with embodiments of the present invention.

FIG. 5 depicts a flowchart of an example implementation, as embodiment 500 of the overall method, in accordance with embodiments of the present invention. For the purpose of explanation, the embodiment 500 described in FIG. 5 may be implemented in one or more of the diagrams and systems depicted in the system illustrated in FIG. 2 (e.g., utilizing one or more components of architecture 200), FIG. 4 (e.g., utilizing embodiment 400, of aspects of the functioning of the monitoring prediction agent), FIG. 7 (e.g., utilizing one or more components of the block diagram of an embodiment of the inventive computing infrastructure monitoring system 700), and FIG. 8 (e.g., utilizing computing system 800). In an example embodiment, one or more components of architecture 200, such as health management agent 214, can perform the processing steps of embodiment 500. In another example embodiment, one or more components of the block diagram of an embodiment of the inventive computing infrastructure monitoring system 700 can perform the processing steps of embodiment 500. Alternatively, execution of embodiment 500 is not limited to this implementation.

Firstly, in step 502 embodiment 500 initializes the monitoring agents. It may be noted that the hear shown flowchart also relates to the above-discussed architecture of involved components for the proposed concept (compare FIG. 2). Next, in step 504, embodiment 500 includes sending an "initialize monitoring" action, which is generated by the health management agent, in which embodiment 500 can also initialize the CBF is initialized (in step 506).

In a next and cyclic step (step 508), embodiment 500 utilizes the monitoring prediction agents to push health stats values to the network (e.g., to the health management agent). Then, in turn, embodiment 500 includes (in step 510) receiving the health status values. Thereby, in step 512, embodiment 500 updates the CBF. Further the statuses of the CBF may also be stored regularly, event-based and/or optionally be reset.

Then, in step 514, embodiment 500 includes reading the CBF statuses and trend snapshots and adding new trend snapshots (in step 516). The reading is the basis of determining (in step 518) corrective actions to all or a portion of the worker nodes of the computing system and also recommending (in step 520) the corrective actions to another systems management system (not shown). In one embodiment, embodiment 500 also includes enabling the health monitoring agent to change (in step 522) the infrastructure art anonymously and potentially move workloads (i.e., worker nodes) from one system to another.

Figure 6:
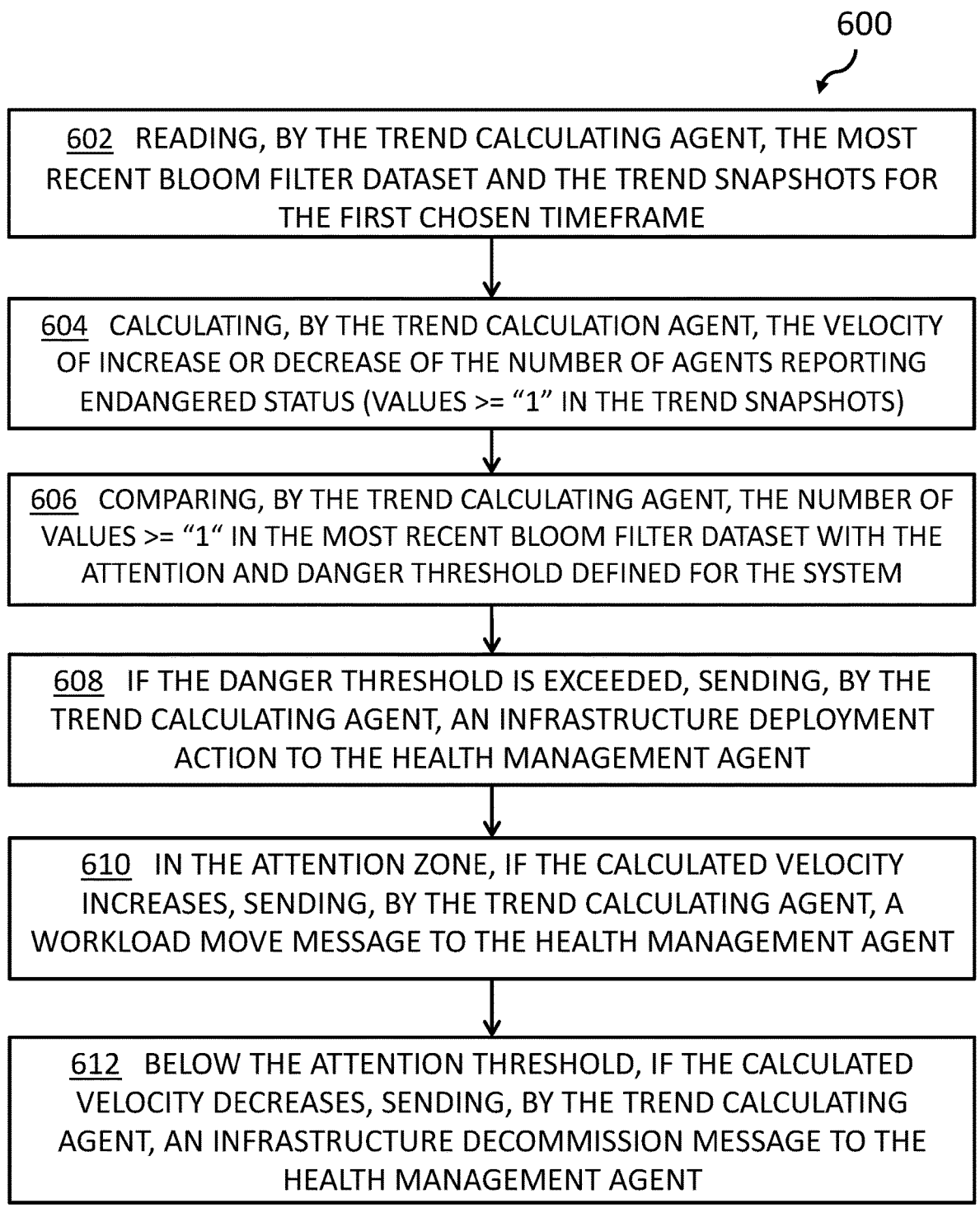
FIG. 6 depicts a flowchart of a more implementation near embodiment of the predictive aspect of the proposed concept, in accordance with embodiments of the present invention.

FIG. 6 depicts a flowchart 600 of an example implementation of an embodiment of the predictive aspect of the proposed concept, in accordance with embodiments of the present invention. For the purpose of explanation, the flowchart 600 described in FIG. 6 may be implemented in one or more of the diagrams and systems depicted in the system illustrated in FIG. 2 (e.g., utilizing one or more components of architecture 200), FIG. 4 (e.g., utilizing embodiment 400, of aspects of the functioning of the monitoring prediction agent), FIG. 7 (e.g., utilizing one or more components of the block diagram of an embodiment of the inventive computing infrastructure monitoring system 700), and FIG. 8 (e.g., utilizing computing system 800). In an example embodiment, one or more components of architecture 200, such as health management agent 214, can perform the processing steps of flowchart 600. In another example embodiment, one or more components of the block diagram of an embodiment of the inventive computing infrastructure monitoring system 700 can perform the processing steps of flowchart 600. Alternatively, execution of flowchart 600 is not limited to this implementation.

In the depicted example, flowchart 600 starts (in step 602) with reading by the trend calculating agent (compare FIG. 2), the most recent CBF datasets and the trend snapshots for a chosen timeframe. Then (in step 604), the trend calculation agent calculates the speed of increase or decrease of the number of agents reporting endangered statuses, i.e., values>=larger or equal to "1" in the trend snapshots.

In step 606, flowchart 600 includes utilizing the trend calculating agent to compare the number of values larger or equal to "1" in the most recent CBS dataset with an attention and a danger threshold defined for the system. If embodiments of the present invention determine that the danger threshold is exceeded, then in step 608, flowchart 600 utilizes the trend calculating agent to send an infrastructure deployment action to the health management agent. In contrast, in the attention zone, if the calculated velocity increases, then flowchart 600 utilizes the trend calculating agent to send the workload shift message to the health management agent (in step 610). Below the attention threshold value, if the calculated velocity decreases, then flowchart 600 utilizes the trend calculating agent to send an infrastructure decommission message to the health management system (in step 612).

Figure 7:
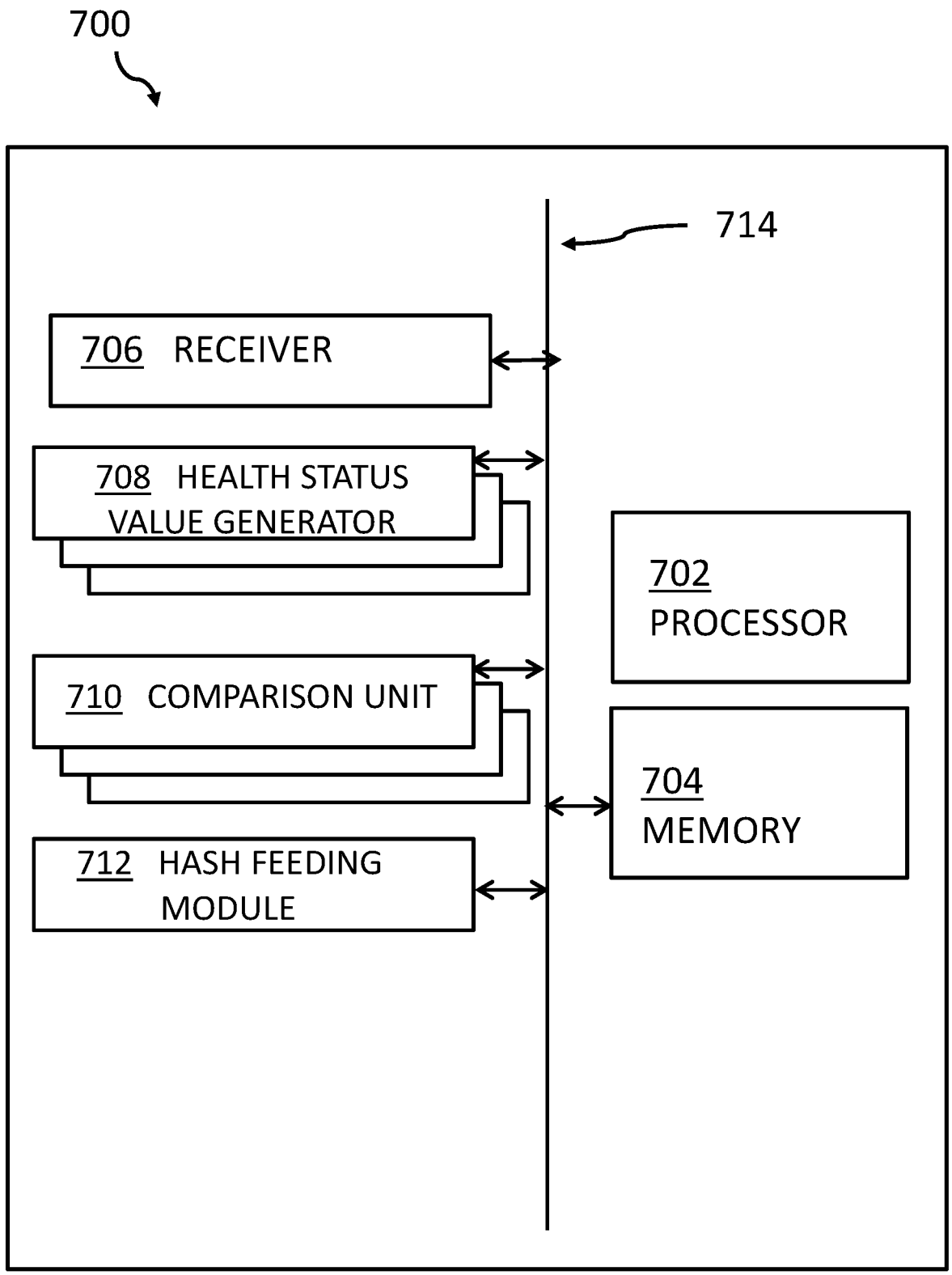
FIG. 7 depicts a block diagram of an embodiment of the inventive computing infrastructure monitoring system, in accordance with embodiments of the present invention.

FIG. 7 depicts a block diagram of an embodiment of the inventive computing infrastructure monitoring system 700, in accordance with embodiments of the present invention. The system 700 for monitoring a health status of a computing system comprising a plurality of worker nodes. The system 700 comprising at least a memory 704 communicatively coupled to a processor 702, wherein the memory stores program code portions, which, when loaded to and executed by the processor 702, enables the processor 702 to receive, at a health management agent (in particular by a receiver 706 as part of the health management system) a binary health status value together with respective identity information from each of the plurality of worker nodes. Embodiments of the present invention can operate to determine the single binary health status value (e.g., utilizing a respective health status value generator 708) for each of the plurality of worker nodes by respective monitoring prediction agent being deployed in each of the plurality of worker nodes, by a time-dependent function of performance metric data values of the respective worker node, which result is compared (e.g., by a comparison unit 710) to a predefined configurable upper threshold value and a configurable lower threshold value specific for each of the worker nodes. In addition, the processor 702 is also be enabled to feed (alternatively, using a hash feeding module, such as feeding unit 712), at the health management agent, the received identity information of each of the plurality of worker nodes to hash functions of a Counting Bloom Filter, thereby generating a dataset indicative of the health status of the computing system (not shown).

It shall be noted, that the receiver 706 and the feeding unit 712 may be part of a respective health management agent system, whereas the health status value generator 708 and the comparison unit 710 may be part of one of the worker nodes (not shown). The different modules and units—in particular the processor 702, the memories 704, the receiver 706, the health status value generator 708, the comparison unit 710, and the feeding unit 712 are electrically interconnected for exchanging electrical signals and/or data. The interconnection may either be implemented using the system internal bus system 714 or, alternatively network connections.

Figure 8:
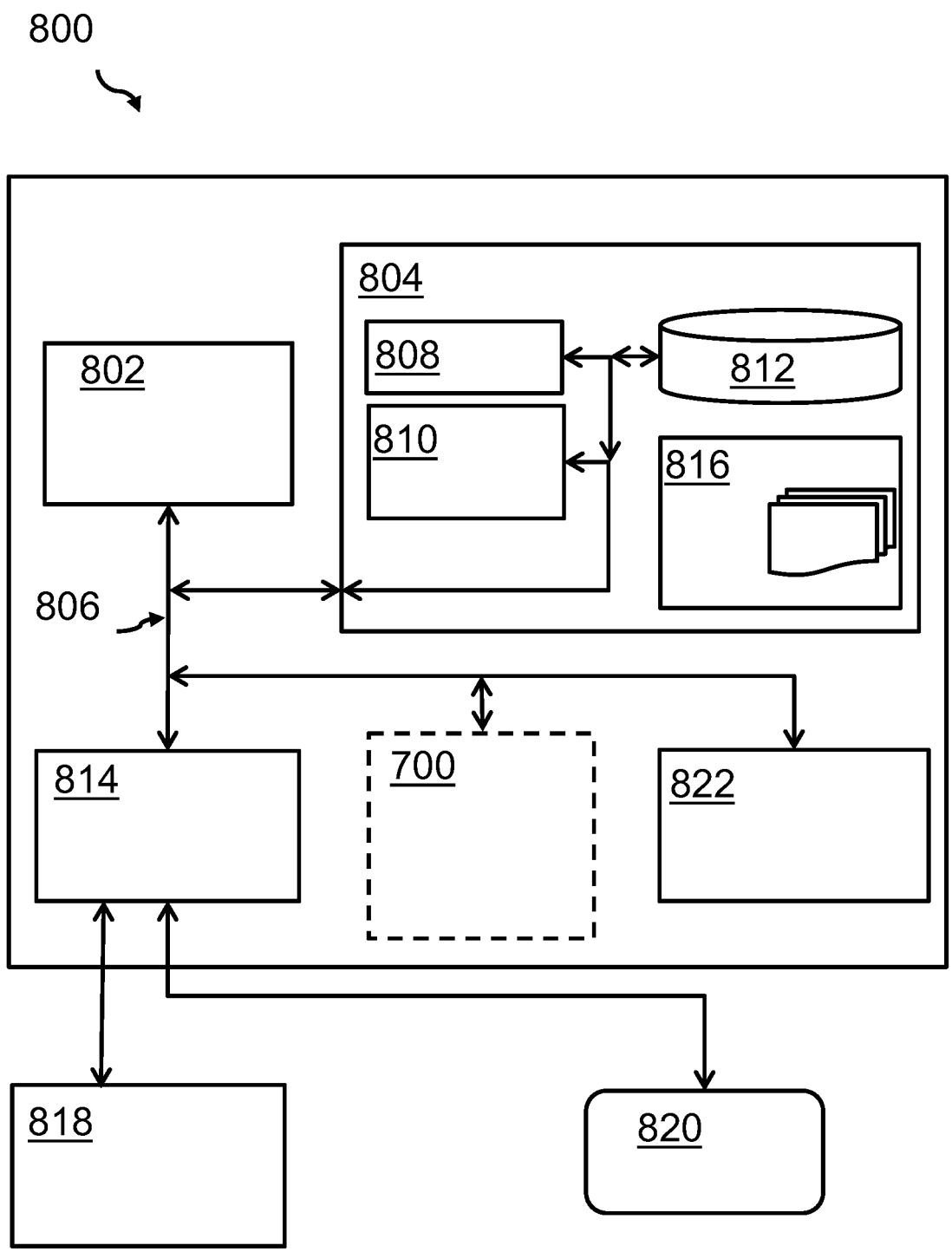
FIG. 8 depicts an embodiment of a computing system comprising at least parts of the computing infrastructure monitoring system of FIG. 7, in accordance with embodiments of the present invention.
Figure 9:
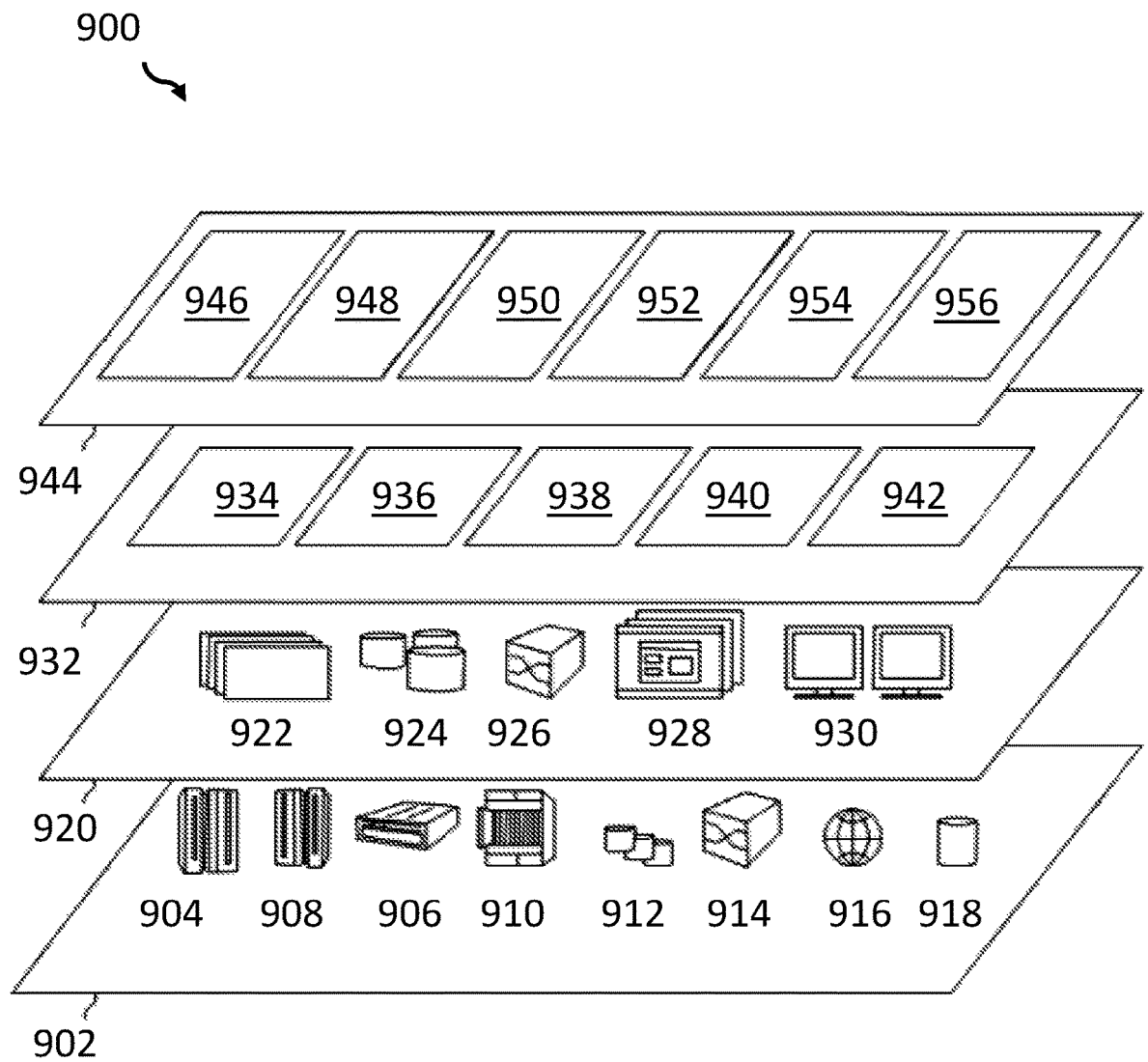
FIG. 9 depicts an embodiment of a cloud computing infrastructure, in accordance with embodiments of the present invention.

Before turning to FIG. 8, attention should be drawn to FIG. 9 showing an embodiment of a cloud computing infrastructure in which the proposed concept may be advantageously be implemented.

Before turning to FIG. 8, FIG. 9 shall be described, depicting a cloud computing environment 900 in which at least parts of the inventive concept may be deployed. A set of functional abstraction layers provided by a cloud computing environment is shown. It should be understood in advance that the components, layers, and functions, shown in FIG. 9, are intended to be illustrative only, and embodiments of the invention are not limited thereto. As depicted, the following layers and corresponding functions are provided: Hardware and software layer 902 include hardware and software components. Examples of hardware components include: mainframes 904; servers 906; RISC (Reduced Instruction Set Computer) architecture based servers 908; blade servers 910; storage devices 912; networks and networking components 914. In some embodiments, software components include network application server software 916 and/or database software 918.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930. In one example, management layer 932 may provide the functions described below. Resource provisioning 934 provides dynamic procurement of computing resources and other resources that are utilized to perform tasks within the cloud computing environment. Metering and pricing 936 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 938 provides access to the cloud computing environment for consumers and system administrators. Service level management 940 provides cloud computing resource allocation and management such that required service levels are met. Service Level Agreement (SLA) planning and fulfillment 942 provides pre-arrangement for, and procurement of, cloud computing resources for which a future requirement is anticipated in accordance with an SLA.

Workload layer 944 provides examples of functionality for which the cloud computing environment may be utilized. Examples of workloads and functions which may be provided from this layer include: mapping and navigation 946; software development and lifecycle management 948; virtual classroom education delivery 950; data analytics processing 952; transaction processing 954; and symbolically the computing infrastructure monitoring system 956 (compare FIG. 7, 700).

Embodiments of the invention may be implemented together with virtually any type of computer, regardless of the platform being suitable for storing and/or executing program code. FIG. 8 depicts, as an example, a computing system 800 suitable for executing program code related to the proposed method (e.g., as part of worker node) the health monitoring agent and/or the trend calculating agent.

The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the Figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processing units 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random-access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the computing infrastructure monitoring system 700 for monitoring a health status of a computing system comprising a plurality of worker nodes may be attached to the bus 806. This attachment may be understood symbolically.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method comprising:
   deploying, by one or more computer processors, a respective monitoring prediction agent in each of a plurality of worker nodes of a computing system;
   determining, by one or more computer processors, for each of the plurality of worker nodes by the respective monitoring prediction agent, a single binary health status value, wherein determining respective single binary health status values further comprises:
      comparing, by one or more computer processors, a time-dependent function of performance metric data values of the respective worker node to a predefined configurable upper threshold value and a configurable lower threshold value;
   receiving, by one or more computer processors, the binary health status values together with respective identity information from each of the plurality of worker nodes; and
   generating, by one or more computer processors, a dataset indicative of a health status of the computing system by feeding the received identity information of each of the plurality of worker nodes to hash functions of a Counting Bloom Filter.

2. The method of claim 1, wherein the performance metric data value corresponds to a memory usage of the respective worker node.

3. The method of claim 2, wherein determining the single binary health status value further comprises:
   determining, by one or more processors, a predicted memory usage using a PID (proportional-integral-derivative) filter as part of the monitoring prediction agent.

4. The method of claim 1:
   wherein the dataset is stored as an array of predefined length,
   wherein a portion of the identity information is used as input to the hash functions,
   wherein output values of the hash functions are index values for addressing data fields in the array, and
   wherein a respective value of each of the addressed data fields of the dataset is increased in response to determining that the respective single binary health status value is logical "1".

5. The method of claim 4, wherein a sum of the values of the data fields in the array is indicative of the health status of the computing system.

6. The method of claim 1, further comprising:
   generating, by one or more processors, computing system load history data by storing timeseries of the datasets of health status values in a persistent storage.

7. The method of claim 6, further comprising:
   determining, by one or more processors, an excepted computing system load value based on the computing system load history data for a specific future point in time.

8. The method of claim 7, further comprising:
   in response to determining that the excepted computing system load value exceeds a predefined computing system load value, initiating, by one or more processors, a recommended corrective infrastructure or workload management action.

9. The method of claim 1, wherein a worker node is selected from the group consisting of a physical computing node, a plurality of physical nodes, a virtual machine, a plurality of virtual machines, a computing container, a plurality of computing containers, a computing process, and a plurality of computing processes.

10. The method of claim 1, further comprising:
    receiving, by one or more processors, the configurable upper threshold value and the configurable lower threshold value during an initiation of the monitoring prediction agent.

11. A computer program product comprising:
    one or more computer readable storage media and program instructions stored on the one or more computer readable storage media, the program instructions comprising:
    program instructions to deploy a respective monitoring prediction agent in each of a plurality of worker nodes of a computing system;
    program instructions to determine for each of the plurality of worker nodes by the respective monitoring prediction agent, a single binary health status value, wherein the program instructions to determine respective single binary health status values further comprise program instructions to:
       compare a time-dependent function of performance metric data values of the respective worker node to a predefined configurable upper threshold value and a configurable lower threshold value;
    program instructions to receive the binary health status values together with respective identity information from each of the plurality of worker nodes; and
    program instructions to generate a dataset indicative of a health status of the computing system by feeding the received identity information of each of the plurality of worker nodes to hash functions of a Counting Bloom Filter.

12. The computer program product of claim 1, wherein the performance metric data value corresponds to a memory usage of the respective worker node.

13. The computer program product of claim 2, wherein the program instructions to determine the single binary health status value further comprise program instructions to:
    determine a predicted memory usage using a PID (proportional-integral-derivative) filter as part of the monitoring prediction agent.

14. A computer system comprising:
one or more computer processors;
one or more computer readable storage media; and
program instructions stored on the computer readable storage media for execution by at least one of the one or more processors, the program instructions comprising:
program instructions to deploy a respective monitoring prediction agent in each of a plurality of worker nodes of a computing system;
program instructions to determine for each of the plurality of worker nodes by the respective monitoring prediction agent, a single binary health status value, wherein the program instructions to determine respective single binary health status values further comprise program instructions to:
compare a time-dependent function of performance metric data values of the respective worker node to a predefined configurable upper threshold value and a configurable lower threshold value;
program instructions to receive the binary health status values together with respective identity information from each of the plurality of worker nodes; and
program instructions to generate a dataset indicative of a health status of the computing system by feeding the received identity information of each of the plurality of worker nodes to hash functions of a Counting Bloom Filter.

15. The computer system of claim 14, wherein the performance metric data value corresponds to a memory usage of the respective worker node.

16. The computer system of claim 15, wherein the program instructions to determine the single binary health status value further comprise program instructions to:
determine a predicted memory usage using a PID (proportional-integral-derivative) filter as part of the monitoring prediction agent.

17. The computer system of claim 14, further comprising program instructions, stored on the computer readable storage media for execution by at least one of the one or more processors, to:
generate computing system load history data by storing timeseries of the datasets of health status values in a persistent storage.

18. The computer system of claim 17, further comprising program instructions, stored on the computer readable storage media for execution by at least one of the one or more processors, to:
determine an excepted computing system load value based on the computing system load history data for a specific future point in time.

19. The computer system of claim 18, further comprising program instructions, stored on the computer readable storage media for execution by at least one of the one or more processors, to:
in response to determining that the excepted computing system load value exceeds a predefined computing system load value, initiate a recommended corrective infrastructure or workload management action.

20. The computer system of claim 14, wherein a worker node is selected from the group consisting of a physical computing node, a plurality of physical nodes, a virtual machine, a plurality of virtual machines, a computing container, a plurality of computing containers, a computing process, and a plurality of computing processes.

* * * * *